United States Patent Office 2,838,527
Patented June 10, 1958

2,838,527

3β-HYDROXY Δ$^{6,8(14)}$STEROIDS AND PROCESS OF PREPARATION OF THE SAME

Gerald D. Laubach, Jackson Heights, and Karl J. Brunings, Malba, N. Y., assignors to Chas. Pfizer & Co., Inc., Brooklyn, N. Y., a corporation of Delaware No Drawing. Application March 17, 1954
Serial No. 416,935

10 Claims. (Cl. 260—397.2)

This invention relates to the preparation of certain novel steroid intermediates useful in the artificial synthesis of therapeutic agents naturally derived from the adrenal cortex and like animal glands and tissues. This application is a continuation-in-part of application Serial No. 222,946, now abandoned, filed on April 25, 1951 by Gerald D. Laubach et al.

Several of the steroid-type constituents and derivatives of the adrenal cortex have been shown to be of considerable importance in the control of physiological functions and in the therapy of certain diseases. It is highly important that synthesis of such compounds from cheap, readily available materials be developed, since the supply of natural precursors, e. g. extracts of animal glands, is definitely limited. The most difficult problem in such a synthesis is to introduce oxygen at the eleventh carbon position of the usual cyclic steroid nucleus. It is generally recognized that the presence of oxygen at this exact position is essential for the high biological activity of such naturally derived compounds as cortisone and compound F. A number of different methods have been proposed for this oxygen introduction. These have been briefly reviewed by Kendall in the Annals of the New York Academy of Science, vol. 50, p. 541–542 (1949). Many involve a number of steps and the overall yields are relatively low. Other methods have been proposed that require the use of corrosive or highly toxic chemicals, and in many cases purification of the products may be difficult. Furthermore, the best of these methods are not readily applicable to those steroids which are most widely available, such as the vegetable steroids.

A particular object of this invention is to rearrange the internal molecular structure of certain poly-unsaturated steroids, which are easily and cheaply obtained from vegetable sources, in such a manner as to implement the ready and convenient introduction of oxygen at the eleventh carbon atom of the nucleus. A general object is the obtainment of new and valuable steroid-type products by isomerization of naturally occurring steroid compounds.

These and other objects are realized by the present process which broadly comprises heating in the presence of sulfur dioxide a steroid compound having conjugated double bonds within its cyclic structure. Surprisingly and for reasons unknown, sulfur dioxide is a highly effective isomerizing agent specifically for cyclic steroid compounds containing at least two homoannular double bonds in conjugation, that is, two conjugated double bonds in a single ring of the steroid nucleus. Heating such a compound with $SO_2$ rearranges these double bonds, and an isomer results which can be readily recovered.

Preferred embodiments of this invention consist of thus isomerizing certain cyclic diene or triene steroid compounds, for example 5,7-diene or 5, 7,9(11)-triene sterols, sterol ethers and sterol esters. The new reaction has been applied for example to dehydroergosterol, its ethers and its esters. Thus, dehydroergosteryl acetate has been isomerized to produce a wholly new compound, identified as isodehydroergosteryl acetate (ergosta-6,8(14), 9(11), 22-tetraen-3 β-yl acetate). Isomers thus derived from a 5,7,9(11)-triene type of steroid are generally of the 6,8(14), 9(11)-triene type and may be described as containing the radical

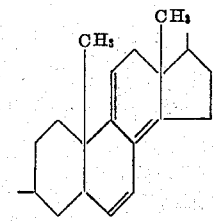

The new isomerization reaction has also been applied to 5,7-diene steroids, for example ergosterol and its esters like ergosteryl acetate, with comparable results, producing 6,8(14)-diene isomers generally containing the radical

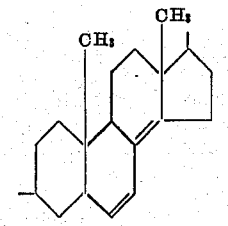

such as the known compound isoergosteryl acetate (ergosteryl B$_2$ acetate).

A few specific reactions and products of this process are indicated below.

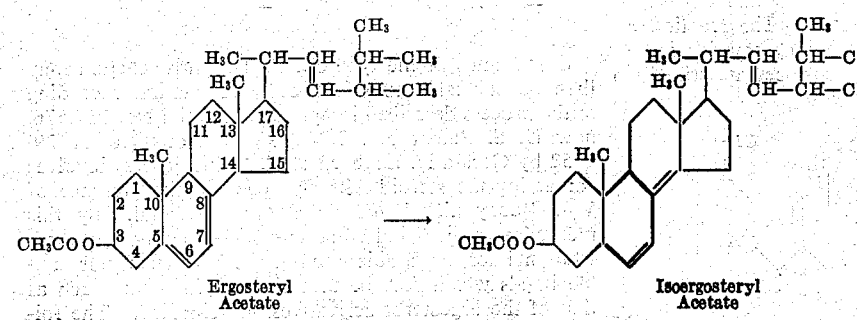

Ergosteryl Acetate → Isoergosteryl Acetate

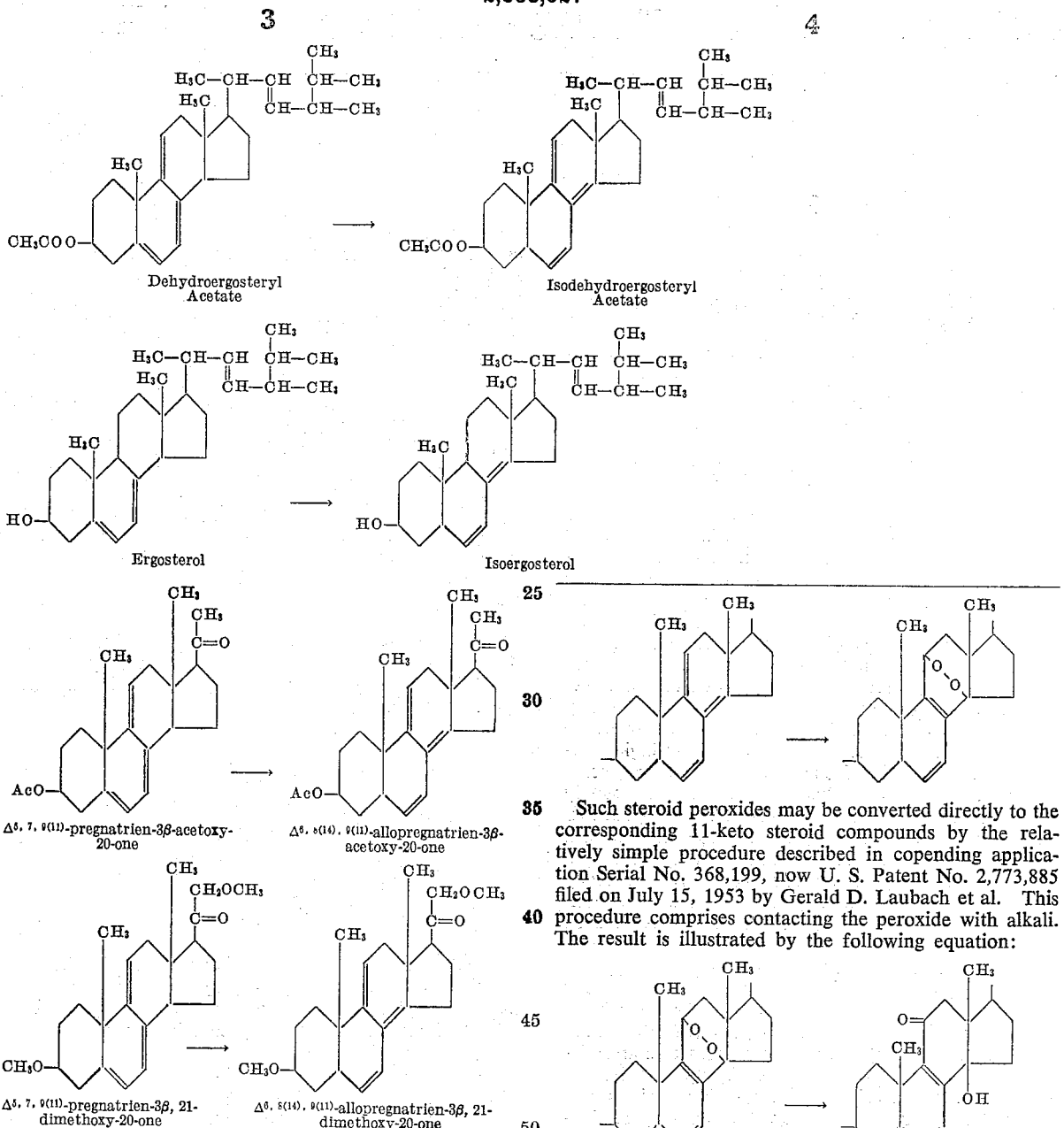

In some cases some of the starting material remains mixed with the product. The two may be separated by forming a Diels-Alder adduct of the starting material, for example with maleic anhydride. For some unknown reason the starting material undergoes this reaction in preference to the product. When the steroid nucleus has been so selected that isomerization results in a conjugated system of double bonds at the 9(11), 8(14) positions, oxygen may be introduced in the 11 position so necessary to obtain therapeutically valuable cortisone and like intermediates. Such oxidation reactions are described in copending application, Serial No. 224,676, now abandoned, filed May 4, 1951 by Gerald D. Laubach. The reaction therein described is a photoperoxidation of steroids including those of the type obtained by the process described above. Some examples are as follows:

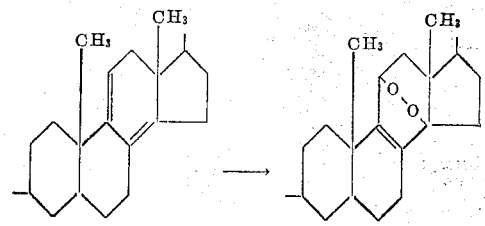

Such steroid peroxides may be converted directly to the corresponding 11-keto steroid compounds by the relatively simple procedure described in copending application Serial No. 368,199, now U. S. Patent No. 2,773,885 filed on July 15, 1953 by Gerald D. Laubach et al. This procedure comprises contacting the peroxide with alkali. The result is illustrated by the following equation:

This same application also describes a process for removal of the 14-OH group by acid dehydration, as follows:

Compounds of the type obtained by this reaction may then be subjected to selective hydrogenation according to the process described in application Serial No. 317,576, now U. S. Patent No. 2,740,797 filed on October 29, 1952 by Gerald D. Laubach et al. This process involves contacting the steroid with hydrogen in the presence of W-7 Raney nickel and an alkaline material. By this method both the 6 and 14 double bonds may be saturated, while neither the double bond at the 8 position, nor double bonds which may be present in a side chain such as that of the ergosterol derivatives, are changed. The following equation illustrates this.

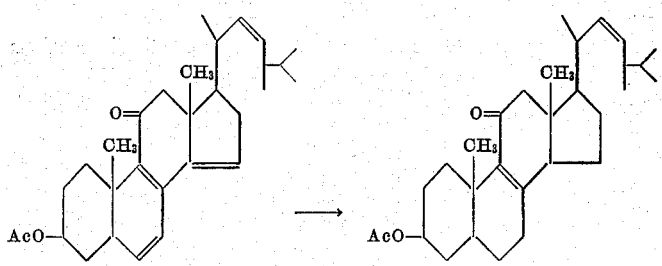

This last compound shown, Δ⁸,²²-ergostadien - 3β - ol - 11-one acetate, is a well known intermediate for the preparation of cortisone. Many of the other products of this present invention are also extremely valuable for this purpose, especially those which already contain at the 17 position a side chain similar to that of cortisone.

Isolated double bonds not within the cyclic structure of the steroid generally have no deleterious effect on isomerization with SO₂. Thus, the side chains attached to the ergosterol or dehydroergosterol-type steroid nucleus at the 17-position or the 3-position may be considerably varied without interfering with the reaction. Rather than the unsaturated aliphatic side chain at C–17 of the ergosterol structure, a compound may be utilized having a carboxyl, an acetyl, a saturated alkyl group, an oxygen (i. e. the 17-keto compound), a residual chain such as is obtained by oxidation at the 22-double bond, or the like attached at that point. Hydroxyl or other groups, ether and ester radicals other than the acetate, for instance the propionate or benzoate, may also be substituted at the 3 position. However, ergosteryl and dehydroergosteryl acetates are preferred by reason of availability, cost, ease of commercial operation and value of the isomeric products. Dehydroergosteryl acetate may be prepared by several known methods, such as mercury-salt dehydrogenation of the readily available ergosteryl acetate. Insofar as can be ascertained, the present invention represents the first use of sulfur dioxide as an isomerizing agent with a steroid compound. It is most unexpected that sulfur dioxide should behave in this manner with steroids, since it commonly adds to double bonds and especially to conjugated double bonds. SO₂ is particularly desirable as an isomerizing agent, since it is very cheap, readily available, and can be removed from reaction mixtures with ease because of its high volatility.

With sulfur dioxide for the isomerization of steroid nuclei, it has been found desirable to employ an elevated temperature. In general, a range of substantially between 75° and 200° C. may be used, while temperatures of about 100° to 125° C. are generally most effective. In order to prevent volatilization of the reagent, the reaction is carried out in a sealed vessel, which may be of glass or any other stable material. It is preferable to add a polymerization inhibitor to the reaction mixture to prevent free radical-type polymerization of the reactant or of the reaction product with sulfur dioxide. For this purpose a compound such as hydroquinone, t-butylcatechol, or any of the other well-known polymerization inhibitors of this type may be used.

It has also been discovered that while double bond rearrangements will take place with SO₂ alone, in order that rearrangement to the 8(14) and 9(11) positions take places with a high degree of selectivity, a moderately strong, nitrogenous organic base should be employed. Compounds such as pyridine, dimethylamine and quinoline are included in this class. The base serves to combine with sulfurous acid which may be formed from SO₂ and any moisture present. Thus, one may use any organic base capable of forming a reasonably stable salt with sulfurous acid under the conditions of the present process.

Although not essential, it is convenient to run the reaction in an organic solvent system, for instance in aromatic hydrocarbons such as benzene or toluene, petroleum fractions such as hexane, or saturated cyclic compounds like cyclohexane. In general, the solvent should be capable of dissolving an appreciable amount of the reactant, at least in the presence of sulfur dioxide and at the elevated temperature of this reaction.

The proportions of all of these materials may be varied considerably. In commercial operation a fairly concentrated solution of the steroid in the chosen solvent (at least about 10 percent by weight for greatest economy) is mixed with an organic base, which is used in a proportion of at least about 0.1 mole, and preferably several moles, per mole of steroid. About 1 to 10 percent of the stabilizing agent or polymerization inhibitor, based on the weight of steroid, and at least about 0.1 or desirably several moles (up to say 100) of sulfur dioxide per mole of steroid are introduced. Since sulfur dioxide is so volatile, the mixture is generally well cooled before sealing in the reaction tube. The temperature is then gradually raised and, for best results, maintained at the chosen level for at least about four hours and not more than thirty hours in order that the reaction may be brought to completion.

The isomerized product of the reaction may be isolated from the mixture in good yield, often over 60 percent. If more highly purified material is desired, it may readily be prepared, although perhaps with a slight decrease in yield. The procedure for the recovery of the new compounds need not be complex, and essentially any desired means may be chosen. According to a particularly efficient method, the cooled mixture is simply removed from the sealed vessel and concentrated to dryness, preferably under vacuum. The solid so obtained is washed with a volatile solvent in which the isomeric steroid has low solubility, for instance methanol. The product is then recrystallized by dissolving in, say, a mixture of chloroform and methanol and concentrating. When most of the chloroform has been removed, a crystalline compound separates which is generally over 90 percent in purity. This is especially useful for synthesizing cortisone and like substances. Material of analytical purity may be prepared by several such recrystallizations.

Highly purified isodehydroergosteryl acetate which has the structure designated above, ergosta-6, 8(14), 9(11), 22-tetraen-3 β-yl acetate, exhibits the following properties:

Melting point 149–151° C. (corr.)
$[\alpha]_D^{25} = -93.8°$ (C=2.01 in chloroform)
log$_e$ at 232.5 m$\mu$=4.25 (ether)
log$_e$ at 287.5 m$\mu$=3.82 (ether)

*Analysis.*—Calcd. for $C_{30}H_{44}O_2$: C, 82.52; H, 10.16. Found: C, 82.37; H, 10.26.

Hydrogenation of it at low pressure with platinum oxide catalyst and in ethyl acetate-chloroform (10–1) mixture causes the rapid uptake of 3 moles of hydrogen. The derivative so obtained has a melting point of 109.8–110.5° C. and $[\alpha]_D^{25} = +4°$ (C=1.01 in chloroform); it is identical with ergosta-8(14)-en-3-β-yl acetate prepared by hydrogenation of ergosteryl acetate. The new isomeric compound also forms a maleic anhydride adduct upon refluxing with the reagent for 18 hours in benzene. This derivative melts at 176–179° C. and has a peak in its ultraviolet absorption spectra as follows: log$_e$ at 274 m$\mu$=3.67 (ether).

When ergosteryl acetate is subjected to the isomerization reaction, there is produced in good yield ergosta-6, 8(14),22-triene-3-β-yl acetate, or isoergosteryl acetate. The purified compound gives these testing results:

Melting point 119.0–120.6° (corr.)
[α]$_D^{25.0}$=—96.20 (C=2.03 in chloroform)
log$_e$ at 252.5 mμ=4.36 (chloroform)

*Analysis.*—Calcd. for $C_{30}H_{46}O_2$: C, 82.14; H, 10.57. Found: C, 82.34; H, 10.79.

It has been hydrolyzed to yield the corresponding alcohol, isoergosterol, ergosta-6,8(14),22-triene-3-β-ol, a purified sample of which has the following physical constants:

Melting point 123.0–124.0° (corr.)
[α]$_D^{23.8}$=—101.3° (C=1.99 in chloroform)

The following examples are given by way of illustration and are not intended as a limitation of this invention. Indeed, as many apparently widely different embodiments of the present invention may be made without departing from the spirit and scope hereof, it is to be understood that the invention is limited as defined in the appended claims only.

EXAMPLE I

Isodehydroergosteryl acetate

To a solution of 4.1 grams (0.0094 mole) of dehydroergosteryl acetate in 20 ml. of dry benzene was added 200 mg. of hydroquinone in 5 ml. of anhydrous pyridine. The homogeneous mixture was cooled to —78° C. and 20 ml. of anhydrous liquid sulfur dioxide was added. The reaction vessel was sealed and then heated to 100° C. for 16½ hours. Concentration of the deep red reaction mixture under vacuum, followed by trituration of the residue with methanol, yielded 3.01 grams (73.4%) of product as nearly colorless platelets, melting point 142–146° C. After recrystallization from chloroform-methanol, then ethyl acetate-methanol, the melting point was 147–150° C. The product had an optical rotation of [α]$_D^{25}$=—74.1° (C, 2.01 in chloroform). An analytically pure sample was obtained by repeated recrystallization from the same solvent combinations, melting point 149–151° C., [α]$_D^{22}$=—93.8° (C, 2.01 in chloroform).

It should be noted that the crude product was itself quite high in purity. Optical rotation is greatly changed by small amounts of the unreacted starting material, since the latter has an optical rotation of about [α]$_D^{25}$=+200°. In many cases the crude product is suitable for use directly as raw material for further reactions.

The equation for the reaction of this example is as follows:

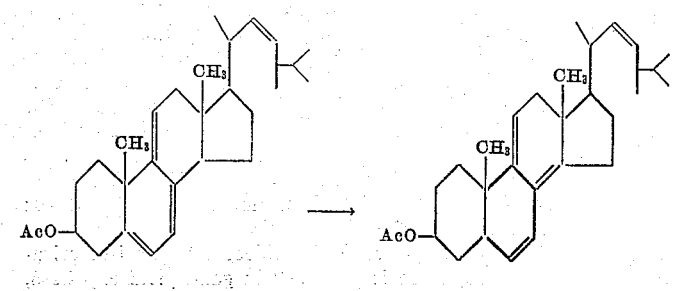

EXAMPLE II

The procedure of Example I was repeated using various ester and ether groups in the 3 position instead of the acetate group present in Example I. The groups used included, for example, formate, propionate and benzoate among the esters, and methyl, ethyl and benzyl among the ethers. The reaction was also carried out with the 3-OH group unprotected. None of these changes in the group at the 3 position had any effect in the overall reaction, and the double bond rearrangement took place in exactly the same manner as before.

EXAMPLE III

Isoergosteryl acetate

A solution of 4.0 grams of ergosteryl acetate in 20 ml. of benzene and 5 ml. of pyridine containing 200 mg. of hydroquinone was cooled to —70° C. Anhydrous liquid sulfur dioxide (20 ml.) was added to the mixture. The reaction vessel was sealed and heated at 100° C. for 16.5 hours. The reaction vessel was then cooled and opened. The mixture was concentrated at reduced pressure to a mass of yellow platelets. The crystals were triturated with several small portions of methanol. The product so obtained was of high purity and weighed 2.82 grams, a yield of 70%. It had a melting point of 115.5 to 117.0° C. Recrystallization from chloroform-methanol and then from ethyl acetate-methanol gave the pure product, the physical constants and analyses of which were hereinbefore discussed.

The equation for the reaction of this example is as follows:

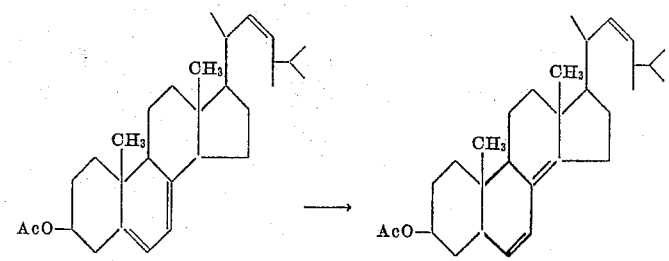

EXAMPLE IV

The procedure of Example III was repeated using various ester and ether groups in the 3 position instead of the acetate group present in Example III. The groups used included, for example, formate, propionate and benzoate among the esters, and methyl, ethyl and benzyl among the ethers. The reaction was also carried out with the 3-OH group unprotected. None of these changes in the group at the 3 position had any effect in the overall reaction, and the double bond rearrangement took place in exactly the same manner as before.

EXAMPLE V

3β-acetoxy-Δ$^{6,8(14),9(11)}$-allopregnatrien-20-one

The method of Example I was applied to 3β-acetoxy-Δ$^{5,7,9(11)}$-pregnatrien-20-one. This treatment with SO$_2$ at 100° for 16 hours led to the formation of the previously unknown compound 3β-acetoxy-Δ$^{6,8(14),9(11)}$-allopregnatrien-20-one. The equation for this reaction is as follows:

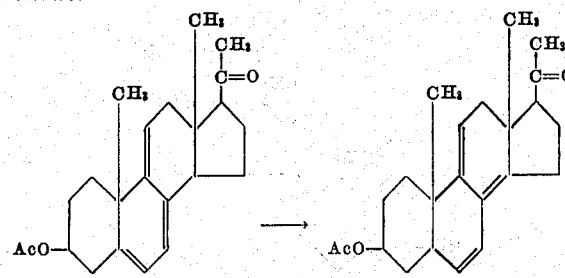

This product may readily be separated from any unreacted starting material by means of a Diels-Alder type reaction, e. g. refluxing with excess maleic anhydride in benzene solution. The starting material quantitatively undergoes condensation with the maleic anhydride, while the product remains unaffected. The desired product can then be readily separated by chromatography on Florisil. Using this technique, a sample of the product was prepared. The compound had the following physical properties:

Melting point 125.8–127.8°:
$\epsilon 231 = 17,200$; $\epsilon 285 = 7,950$
$[\alpha]_D^{26} + 23°$ (CHCl$_3$)

Additional purification may change these properties slightly.

EXAMPLE VI

The procedure of Example V was repeated using various ester and ether groups in the 3 position instead of the acetate group present in Example V. The groups used included, for example, formate, propionate and benzoate among the esters, and methyl, ethyl and benzyl among the ethers. The reaction was also carried out with the 3-OH group unprotected. None of these changes in the group at the 3 position had any effect in the overall reaction, and the double bond rearrangement took place in exactly the same manner as before.

EXAMPLE VII

The method of Example I was applied to 3β-acetoxy-Δ$^{5,7}$-pregnadien-20-one. In a manner similar to that described above, the product 3β-acetoxy-Δ$^{6,8(14)}$-allopregnadien-20-one was formed. The equation for the reaction of this example is as follows:

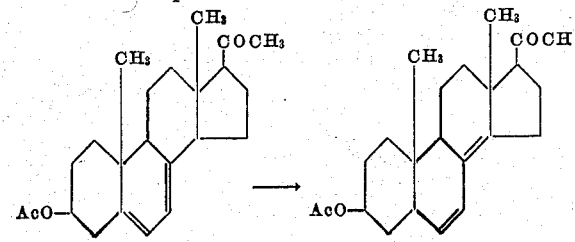

EXAMPLE VIII

The procedure of Example VII was repeated using various ester and ether groups in the 3 position instead of the acetate group present in Example VII. The groups used included, for example, formate, propionate and benzoate among the esters, and methyl, ethyl and benzyl among the ethers. The reaction was also carried out with the 3-OH group unprotected. None of these changes in the group at the 3 position had any effect in the overall reaction, and the double bond rearrangement took place in exactly the same manner as before.

EXAMPLE IX

The method of Example I was applied to 3β,21-diacetate-Δ$^{5,7,9(11)}$-pregnatrien-20-one. In a manner similar to that described above, the product 3β,21-diacetate-Δ$^{6,8(14),9(11)}$-allopregnatriene-20-one was formed. The equation for the reaction of this example is as follows:

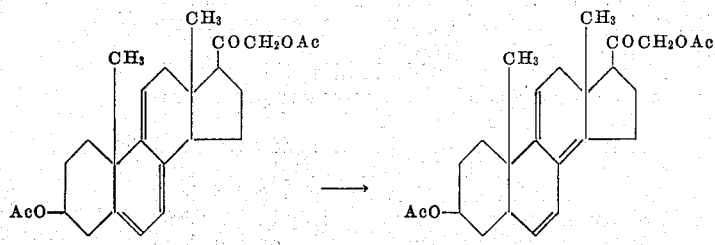

EXAMPLE X

The procedure of Example IX was repeated using various ester and ether groups in the 3 and 21 positions instead of the acetate groups present in Example IX. The groups used included for example, formate, propionate and benzoate among the esters, and methyl, ethyl and benzyl among the ethers. The reaction may also be carried out with the 3 and 21-OH groups unprotected. None of these changes in the groups at the 3 and 21 positions had any effect in the overall reaction, and all the double bond rearrangements took place in exactly the same manner as before.

EXAMPLE XI

The method of Example I was applied to 3β,21-diacetate-Δ$^{5,7}$-pregnadien-20-one. In a manner similar to that described above, the product 3β,21-diacetate-Δ$^{6,8(14)}$-allopregnadien-20-one was formed. The equation for the reaction of this example is as follows:

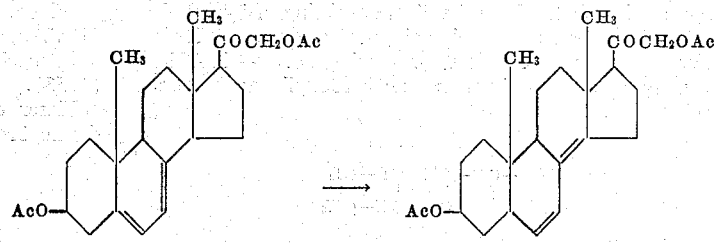

EXAMPLE XII

The procedure of Example XI was repeated using various ester and ether groups in the 3 and 21 positions instead of the acetate groups present in Example XI. The groups used included, for example, formate, propionate and benzoate among the esters, and methyl, ethyl and benzyl among the ethers. The reaction may also be carried out with the 3 and 21-OH groups unprotected. None of these changes in the groups at the 3 and 21 positions had any effect in the overall reaction, and all the double bond rearrangements took place in exactly the same manner as before.

What is claimed is:
1. A process which comprises heating in the presence of sulfur dioxide, a polymerization inhibitor and an organic base, a steroid compond selected from the class consisting of 5(6), 7(8)-diene and 5(6), 7(8), 9(11)- triene steroids substituted in the B- and C-rings only by a 10-methyl and a 13-methyl group, and recovering the resulting isomer of said compound.

2. A process for preparing a steroid compound which has double bonds at the 6 and 8(14) positions, which process comprises heating with sulfur dioxide and an organic base in the presence of a polymerization inhibitor 5(6), 7(8)-diene steroid substituted in the B- and C-rings only by a 10-methyl and a 13-methyl group.

3. A process for preparing a steroid compound which has double bonds at the 6,8(14) and 9(11) positions, which process comprises heating with sulfur dioxide and an organic base in the presence of a polymerization inhibitor a 5(6), 7(8), 9(11)-triene steroid substituted in the B- and C-rings only by a 10-methyl and a 13-methyl group.

4. A process which comprises heating with sulfur dioxide and an organic base in the presence of a polymerization inhibitor a compound selected from the class consisting of ergosterol and its esters and ethers, and recovering the resulting isoergosteryl compound.

5. A process which comprises heating with sulfur dioxide and an organic base in the presence of a polymerization inhibitor a compound selected from the class consisting of dehydroergosterol and its esters and ethers, and recovering the resulting isodehydroergosteryl compound.

6. A process which comprises heating together in a closed system at a temperature substantially between 75° and 200° C., an organic solvent, a steroid compound selected from the class consisting of 5(6), 7(8)-diene and 5(6), 7(8), 9(11)-triene steroids substituted in the B- and C-rings only by a 10-methyl and a 13-methyl group, at least a one-tenth molar proportion of sulfur dioxide, at least a one-tenth molar proportion of an organic base, and from 1% to 10% by weight of said steroid compound of a polymerization inhibitor, and recovering the isomer of said steroid compound thereby produced.

7. A steroid compound having the formula

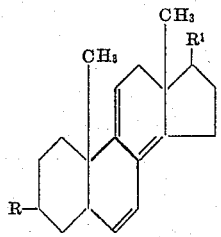

where R is selected from the class consisting of hydroxyl, and hydrocarbon carboxylic acid ester groups, and R¹ is selected from the class consisting of —COCH₃, COCH₂OH and the hydrocarbon carboxylic acid esters thereof, and

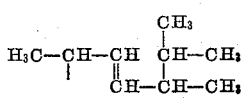

8. A steroid compound chosen from the group consisting of

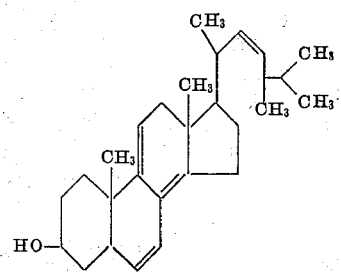

and the 3-hydrocarbon carboxylic acid esters thereof.

9. A steroid compound chosen from the group consisting of

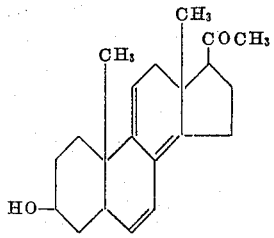

and the 3-hydrocarbon carboxylic acid esters thereof.

10. A steroid compound chosen from the group consisting of

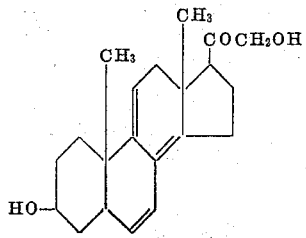

and the 3-hydrocarbon carboxylic acid esters thereof.

References Cited in the file of this patent

UNITED STATES PATENTS

| | | |
|---|---|---|
| 2,436,195 | Callan | Feb. 17, 1948 |
| 2,593,248 | Bernstein | Apr. 15, 1952 |

OTHER REFERENCES

Windaus: Annalen 534, 22–41 (1938); 552, 142–152 (1942).

Laubach et al.: Jour. Am. Chem. Soc. 75, 1514–15 (1953).

Fieser et al.: Natural Products Related to Phenanthrene, 3rd ed., pp. 230–33, 365–6 (1949).